(12) United States Patent
Luo et al.

(10) Patent No.: US 12,741,249 B2
(45) Date of Patent: Sep. 22, 2026

(54) FILTER CARTRIDGE AND WATER PURIFICATION SYSTEM

(71) Applicant: FOSHAN MICRO MIDEA FILTER MFG. CO., LTD., Foshan (CN)

(72) Inventors: Anluo Luo, Foshan (CN); Jiulin Yang, Foshan (CN); Jin Woo Hyun, Foshan (CN); Juan Chen, Foshan (CN)

(73) Assignee: FOSHAN MICRO MIDEA FILTER MFG. CO., LTD., Foshan (CN)

( * ) Notice: Subject to any disclaimer, the term of this patent is extended or adjusted under 35 U.S.C. 154(b) by 353 days.

(21) Appl. No.: 18/434,019

(22) Filed: Feb. 6, 2024

(65) Prior Publication Data

US 2024/0173670 A1 May 30, 2024

Related U.S. Application Data

(63) Continuation of application No. PCT/CN2022/076940, filed on Feb. 18, 2022.

(30) Foreign Application Priority Data

Aug. 20, 2021 (CN) ......................... 202110964900.8

(51) Int. Cl.
*B01D 61/02* (2006.01)
*B01D 29/11* (2006.01)
*B01D 61/08* (2006.01)

(52) U.S. Cl.
CPC .......... *B01D 61/025* (2013.01); *B01D 29/117* (2013.01); *B01D 61/08* (2013.01);
(Continued)

(58) Field of Classification Search
CPC .... B01D 61/025; B01D 29/117; B01D 61/08; B01D 2201/291; B01D 2313/21;
(Continued)

(56) References Cited

FOREIGN PATENT DOCUMENTS

CN 106731109 A * 5/2017 ........... B01D 29/216
CN 110898671 A 3/2020
(Continued)

OTHER PUBLICATIONS

Translation of Xuan (CN 106731109) (Year: 2017).*
(Continued)

*Primary Examiner* — Ekandra S. Miller-Cruz
(74) *Attorney, Agent, or Firm* — Westbridge IP LLC

(57) ABSTRACT

Disclosed are a filter cartridge and a water purification system. The filter cartridge includes a shell, a filter body and a central tube; the shell is provided with an accommodating chamber and a water inlet, a pure water outlet, and a wastewater outlet communicated with the accommodating chamber; the filter body is provided in the accommodating chamber, the water inlet is communicated with the wastewater outlet through the filter body, a water storage space is provided between an outer peripheral wall of the filter body and an inner wall of the shell, and the water storage space is communicated with the pure water outlet; and the central tube is provided in the filter body, a sidewall of the central tube is provided with a central hole communicated with the filter body, and a through hole at a lower end of the central tube is communicated with the water storage space.

7 Claims, 6 Drawing Sheets

(52) U.S. Cl.
CPC .... *B01D 2201/291* (2013.01); *B01D 2313/21* (2013.01); *B01D 2313/44* (2013.01)

(58) Field of Classification Search
CPC ............ B01D 2313/44; B01D 2313/04; B01D 2313/08; B01D 2313/23; B01D 61/10; C02F 1/441; C02F 1/001; C02F 2209/10
USPC ...................................................... 210/321.78
See application file for complete search history.

(56) References Cited

FOREIGN PATENT DOCUMENTS

| | | | |
|---|---|---|---|
| CN | 212091708 | U | 12/2020 |
| CN | 112299532 | A | 2/2021 |
| CN | 112479409 | A | 3/2021 |
| CN | 213101622 | U | 5/2021 |
| CN | 213101624 | U | 5/2021 |
| CN | 213493002 | U | 6/2021 |
| CN | 213966013 | U | 8/2021 |
| CN | 213966014 | U | 8/2021 |
| CN | 113772837 | A | 12/2021 |
| CN | 215946914 | U | 3/2022 |
| KR | 20190014607 | A | 2/2019 |

OTHER PUBLICATIONS

Translation of Lin (CN 110898671) (Year: 2019).*
Translation of Wu (CN 112299532) (Year: 2020).*
Translation of Tao (CN 213493002) (Year: 2020).*
First Office Action issued in counterpart Chinese Patent Application No. 202110964900.8, dated Apr. 4, 2024.
International Search Report and Written Opinion issued in corresponding PCT Application No. PCT/CN2022/076940, dated May 17, 2022.

* cited by examiner

FILTER CARTRIDGE AND WATER PURIFICATION SYSTEM

CROSS-REFERENCE TO RELATED APPLICATIONS

The present application is a continuation application of International Application No. PCT/CN2022/076940, filed on Feb. 18, 2022, which claims priority to Chinese Patent Application No. 202110964900.8, filed on Aug. 20, 2021. The disclosures of the above-mentioned applications are incorporated herein by reference in their entireties.

TECHNICAL FIELD

The present application relates to the technical field of water purification, and in particular to a filter cartridge and a water purification system including the filter cartridge.

BACKGROUND

As for the filter cartridges in the related art, especially the large-flux reverse osmosis filter cartridges, the reverse osmosis (RO) membrane is installed in the filter cartridge or in the membrane shell, and the proportion of the inlet water and the wastewater in the filter cartridge system is much greater than that of the pure water. After the whole machine is shut down, the water-in solenoid valve is closed, and a closed space is formed in the RO filter cartridge shell. At this time, the water in each part of the filter cartridge shell is mixed and diluted. In this way, after the shutdown, the total dissolved solids (TDS) value of the water-in end in the entire filter cartridge is very high. When the machine is restarted, and the water-in solenoid valve is opened, the water retained in the filter cartridge with high TDS value will first to be filtered under the action of pressure. Since the TDS value of the inlet water increases, the TDS value of the pure water will naturally be higher when the machine is restarted. Therefore, the filter cartridge in the related art has the problem that the TDS value of the first cup of water is relatively high.

SUMMARY

The main purpose of the present application is to provide a filter cartridge and a water purification system including the filter cartridge, aiming to solve the problem that the TDS value of the first cup of water in the large-flux reverse osmosis filter cartridges is relatively high.

In order to solve the above problems, the present application provides a filter cartridge, including: a shell, a filter body and a central tube; the shell is provided with an accommodating chamber and a water inlet, a pure water outlet, and a wastewater outlet communicated with the accommodating chamber; the filter body is provided in the accommodating chamber, the water inlet is communicated with the wastewater outlet through the filter body, a water storage space is provided between an outer peripheral wall of the filter body and an inner wall of the shell, and the water storage space is communicated with the pure water outlet; and the central tube is provided in the filter body, a sidewall of the central tube is provided with a central hole communicated with the filter body, and a through hole at a lower end of the central tube is communicated with the water storage space.

In an embodiment, a baffle is provided in the central tube, the central tube is divided into a first chamber and a second chamber by the baffle, the first chamber is communicated with a through hole at an upper end of the central tube, the second chamber is communicated with a through hole at a lower end of the central tube, and the central hole is communicated with the second chamber.

In an embodiment, the filter cartridge further includes: an upper end cap assembly and a lower end cap assembly, and an upper end surface of the filter body is connected to the shell through the upper end cap assembly, a lower end surface of the filter body is connected to the shell through the lower end cap assembly, the upper end cap assembly and the lower end cap assembly are also respectively formed with a first positioning member and a second positioning member, the first positioning member and the second positioning member respectively extend into the first chamber and the second chamber, the second positioning member is formed with a communication hole, and the second chamber is communicated with the water storage space through the communication hole.

In an embodiment, the filter cartridge further includes: an outer skeleton tube provided between an outside of the filter body and the water storage space, and an upper end of the outer skeleton tube is hermetically connected to the upper end cap assembly, and a lower end of the outer skeleton tube is hermetically connected to the lower end cap assembly.

In an embodiment, the outer skeleton tube is respectively connected to the upper end cap assembly and the lower end cap assembly through a sealing member; or the outer skeleton tube is respectively connected to the upper end cap assembly and the lower end cap assembly through a rotation welding, a glue bonding or a rubber sealing assembly.

In an embodiment, the outer skeleton tube is integrated with the upper end cap assembly; or the outer skeleton tube is integrated with the lower end cap assembly.

In an embodiment, a material of the outer skeleton tube is metal, plastic or fiberglass made of a mixture of glass fiber and AB glue.

In an embodiment, the upper end cap assembly includes a first upper end cap and a second upper end cap, the first upper end cap is formed with a first through hole, the filter body is communicated with the wastewater outlet through the first through hole, the second upper end cap is formed with a second through hole and a third through hole, the second through hole is configured to avoid the first through hole, the water inlet is communicated with the filter body through the third through hole, the first positioning member is formed on the first upper end cap, and the second upper end cap is hermetically connected to the outer skeleton tube.

In an embodiment, the filter body is a reverse osmosis (RO) membrane filter body.

The present application also provides a water purification system including the filter cartridge.

The technical solution of the present application provides a filter cartridge and a water purification system including the filter cartridge. Specifically, the through hole at the lower end of the central tube of the filter cartridge is communicated with the water storage space. The filtered pure water flows into the water storage space through the through hole at the lower end of the central pipe, and flows out from the pure water outlet. In this way, the proportion of pure water is increased during the filtration of the filter cartridge, thus the problem that the TDS value of the first cup of water is relatively high in the related art is solved.

BRIEF DESCRIPTION OF THE DRAWINGS

In order to illustrate the technical solutions in the embodiments of the present application or in the related art more clearly, the following briefly introduces the accompanying drawings required for the description of the embodiments or the related art. Obviously, the drawings in the following description are only part of embodiments of the present application. For those skilled in the art, other drawings can also be obtained according to the structures shown in these drawings without any creative effort.

Figure 1:
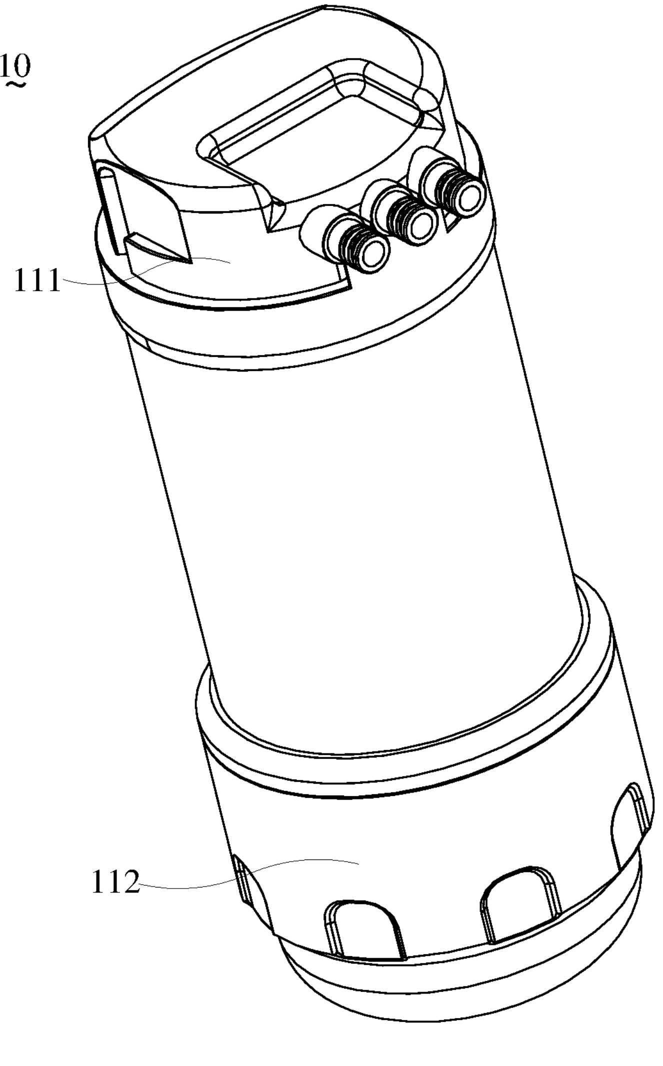
FIG. 1 is a schematic structural view of a filter cartridge according to an embodiment of the present application.

The realization of the objective, functional characteristics, and advantages of the present application are further described with reference to the accompanying drawings.

DETAILED DESCRIPTION OF THE EMBODIMENTS

The technical solutions of the embodiments of the present application will be described in more detail below with reference to the accompanying drawings. It is obvious that the embodiments to be described are only some rather than all of the embodiments of the present application. All other embodiments obtained by persons skilled in the art based on the embodiments of the present application without creative efforts shall fall within the scope of the present application.

It should be noted that all directional indications (such as up, down, left, right, front, back, etc.) in the embodiments of the present application are only used to explain the relative positional relationship, the movement situation, etc. among various assemblies under a certain posture as shown in the drawings. If the specific posture changes, the directional indication also changes accordingly.

In addition, the descriptions of "first", "second", etc. are only for the purpose of description, and should not be construed as indicating or implying relative importance or implicitly indicating the number of technical features indicated. Thus, a feature delimited with "first", "second" may expressly or implicitly include at least one of that feature. Besides, the meaning of "and/of" appearing in the application includes three parallel scenarios. For example, "A and/or B" includes only A, or only B, or both A and B. In addition, the technical solutions between the various embodiments can be combined with each other, but must be based on the realization by those skilled in the art. When the combination of technical solutions is contradictory or cannot be realized, it should be considered that the combination of such technical solutions does not exist or fall within the scope of protection claimed in the present application.

When the filter cartridge in the related art, especially the large-flux reverse osmosis (RO) membrane filter cartridge, is in working condition, the proportion of the raw water and the wastewater in the filter cartridge system is much greater than that of the pure water. Specifically, the filtered pure water flows into the central hole on the side of the central tube and is discharged from the through hole at the upper end of the central tube. That is, during the filtration process, the path that the pure water needs to flow through is the central tube. After the whole machine is shut down, the water-in solenoid valve is closed, and a closed space is formed in the RO filter cartridge. The wastewater in a membrane belt in the filter cartridge and the wastewater in an inner sidewall of the filter cartridge and the wastewater end of the RO membrane will mix and dilute with the raw water in the filter cartridge, so that a total dissolved solids (TDS) of the water-in end in the entire filter cartridge is very high. TDS is the acronym for total dissolved solids, which refers to the concentration of total dissolved substances in water. The TDS value is generally used to measure the purity of the pure water. When the machine is restarted, the water-in solenoid valve is opened, and the water retained in the filter cartridge with high TDS value will be filtered first under the action of pressure. Since the TDS value of the inlet water increases, the TDS value of the pure water will naturally be high when the machine is restarted, so that it is generally not recommended to drink the first glass of water because the TDS value is too high.

In the related art, two methods are often used to solve the problem that the TDS value of the first cup of water is too high. One way is to add a water storage pressure tank. After the machine is started, the pure water will be released from the water storage pressure tank first. However, with this setting, the TDS value of the water in the water storage tank will gradually increase after long-term use. Another way is to set up another water-path to backwash the water-in end of the RO with pure water when the filtration is stopped, which requires a large number of solenoid valves, and a large amount of pure water to backwash for each shutdown. That is to say, this method has the problem of high cost.

Figure 2:
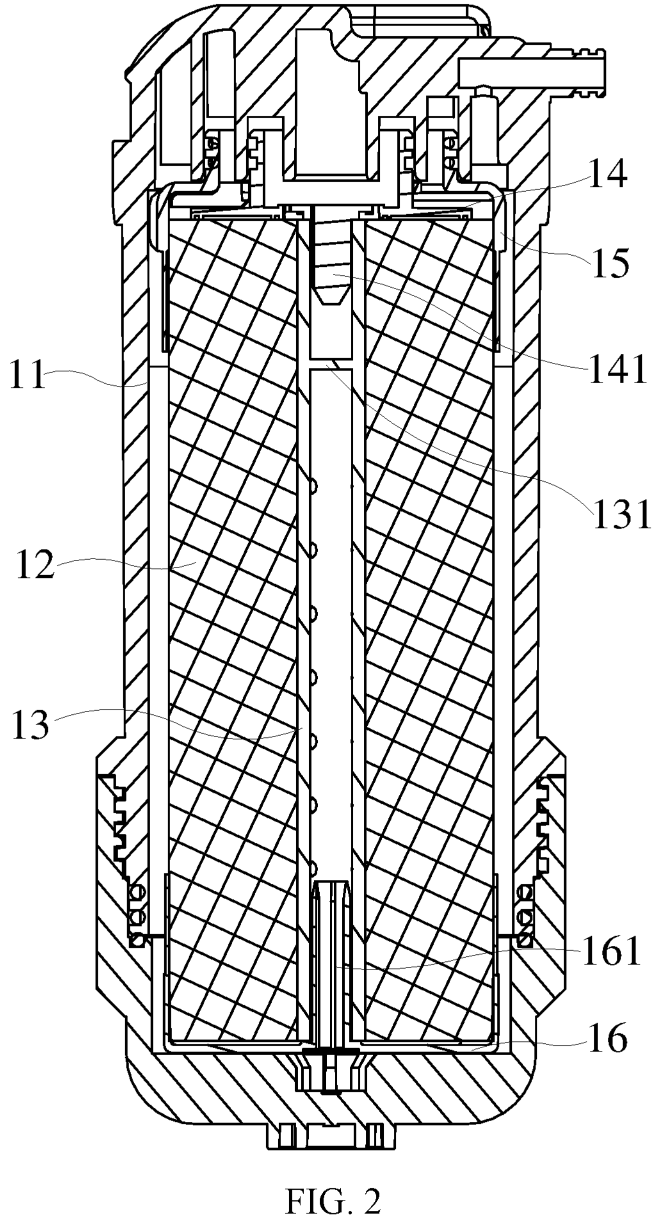
FIG. 2 is a cross-sectional view of the filter cartridge in FIG. 1.
Figure 3:
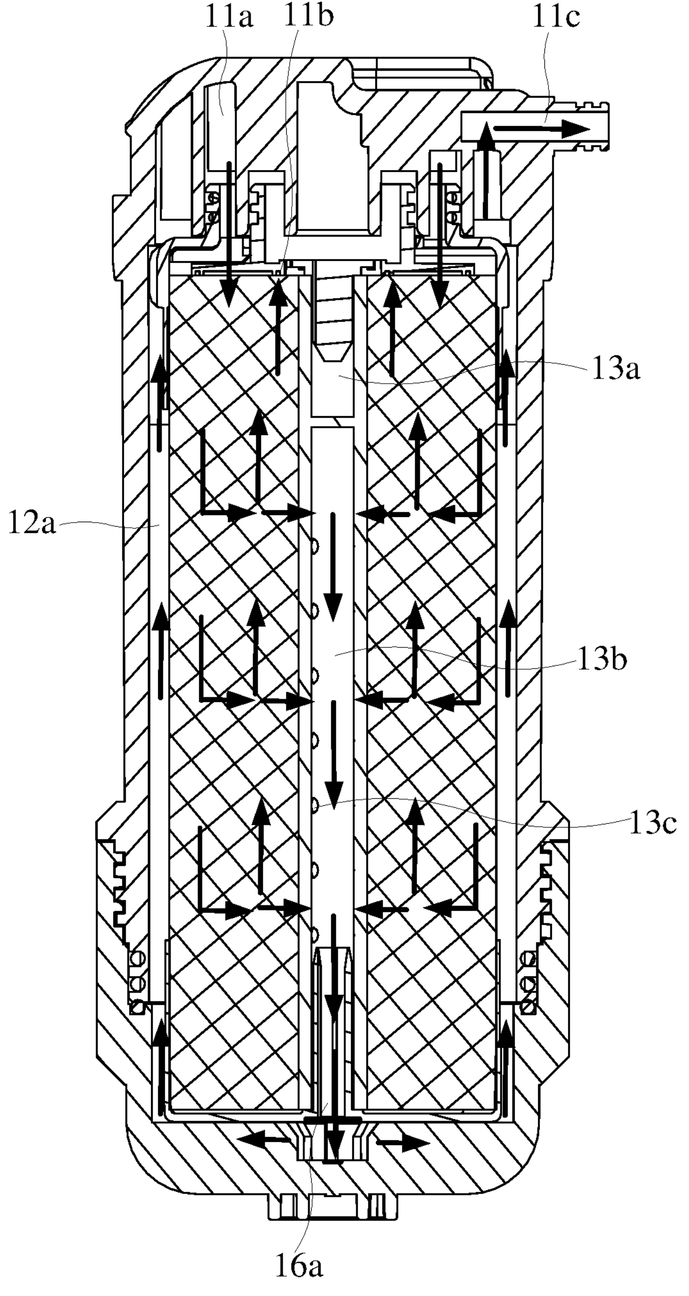
FIG. 3 is a flow path view of the filter cartridge in FIG. 1.

As shown in FIG. 1, FIG. 2 and FIG. 3, the present application provides a filter cartridge 10, including a shell 11, a filter body 12 and a central tube 13. An accommodating chamber is provided in the shell 11, and the shell 11 is provided with a water inlet 11*a*, a pure water outlet 11*b*, and a wastewater outlet 11*c* that are communicated with the accommodating chamber. The filter body 12 is provided in the accommodating chamber, the water inlet 11*a* is communicated with the wastewater outlet 11*c* through the filter body 12, a water storage space 12*a* is provided between an outer peripheral wall of the filter body 12 and an inner wall of the shell 11, and the water storage space 12*a* is communicated with the pure water outlet 11*b*. The central tube 13 is provided in the filter body 12, a sidewall of the central tube 13 is provided with a central hole 13*c* communicated with the filter body 12, and a through hole at the lower end of the central tube 13 is communicated with the water storage space 12*a*.

In an embodiment, the raw water enters from the water inlet 11*a* and is filtered into the pure water and the wastewater after being filtered by the filter body 12. The wastewater is discharged through the wastewater outlet 11*c*. The pure water enters the central tube 13 through the central hole 13*c*, flows into the water storage space 12*a* through the through hole at the lower end of the central tube 13, and flows out from the pure water outlet 11*b*. Compared with the filter cartridge 10 in the related art, the pure water does not flow out directly from the through hole at the upper end of the central tube 13, but flows in from the through hole at the lower end of the central tube 13 and then passes through the water storage space 12*a*. Therefore, in addition to the central tube 13, the path required for the pure water to reach the pure water outlet 11*b* also includes the water storage space 12*a*. In this way, the proportion of the pure water in the filter cartridge 10 is increased when the filter cartridge 10 is working, and the TDS value of the filter cartridge 10 after shutdown is decreased, thereby reducing the TDS value of the first glass of water when restarting.

As shown in FIG. 1, in an embodiment, a baffle 131 is provided in the central tube 13, the central tube 13 is divided into a first chamber 13*a* and a second chamber 13*b* by the baffle 131, the first chamber 13*a* is communicated with the through hole at the upper end of the central tube 13, the second chamber 13*b* is communicated with the through hole at the lower end of the central tube 13, and the central hole 13*c* is communicated with the second chamber 13*b*.

It is worth noting that the first chamber 13*a* is isolated from the water storage space 12*a*. The pure water entering the central tube 13 through the central hole 13*c* flows into the water storage space 12*a* through the second chamber 13*b*. The baffle 131 separates the through hole at the upper end of the central tube 13 from the water storage space 12*a*. Thus, the pure water can be easily guided into the water storage space 12*a*. In another embodiment, a blocking member can also be provided at the upper end of the central tube 13 to block the through hole at the upper end of the central tube 13. However, compared with the solution of setting the baffle 131 in the central tube 13, setting the blocking member will cause greater structural changes. As a result, other accessories in the filter cartridge 10 also need to be redesigned, resulting in greater manufacturing costs. The solution provided in the present application is to install the baffle 131 in the central tube 13. By changing the internal structure of the central tube 13, the overall water-path flow direction of the filter cartridge 10 is changed. In this way, the structure of the connection at both ends of the central tube 13 does not change much, and no need for the connection structures at both ends of the changed central tube 13 to be redesigned and manufactured. In this way, the manufacturing cost of the filter cartridge 10 is greatly reduced.

Figure 4:
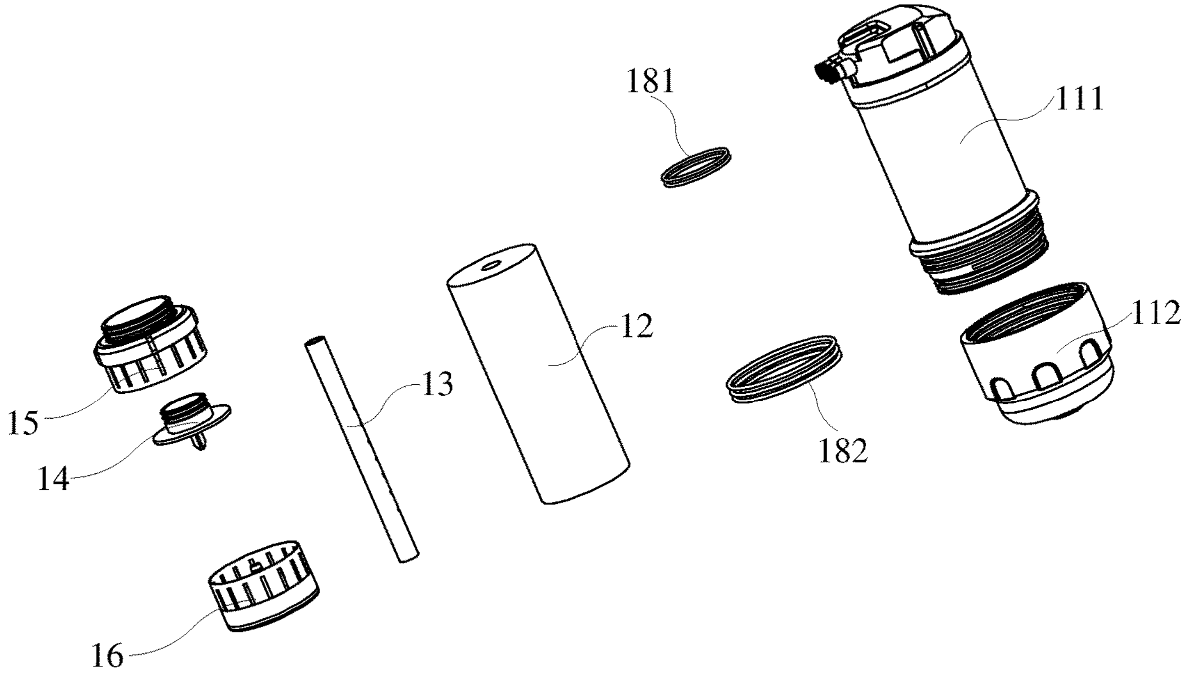
FIG. 4 is an exploded view of the filter cartridge in FIG. 1.
Figure 5:
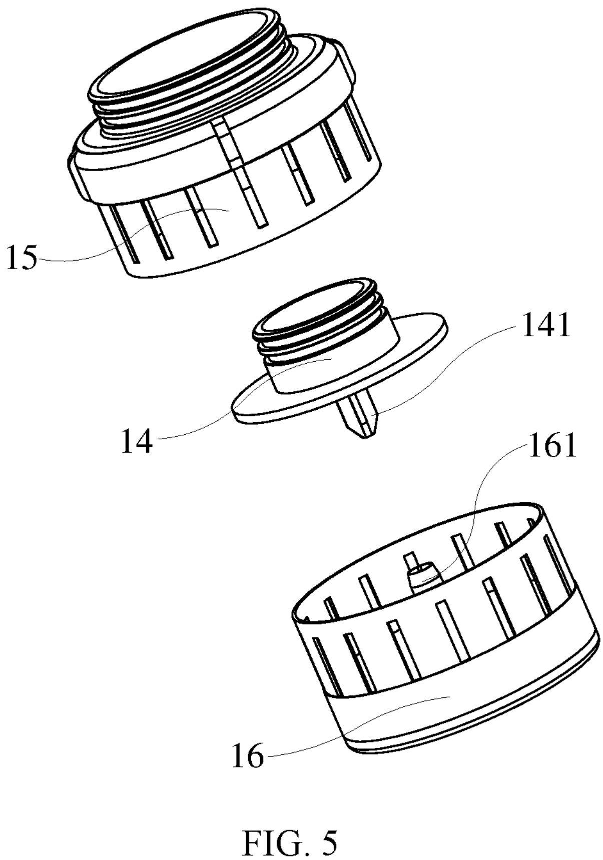
FIG. 5 is a schematic structural view of an upper end cap assembly and a lower end cap assembly according to the embodiment in FIG. 4.
Figure 6:
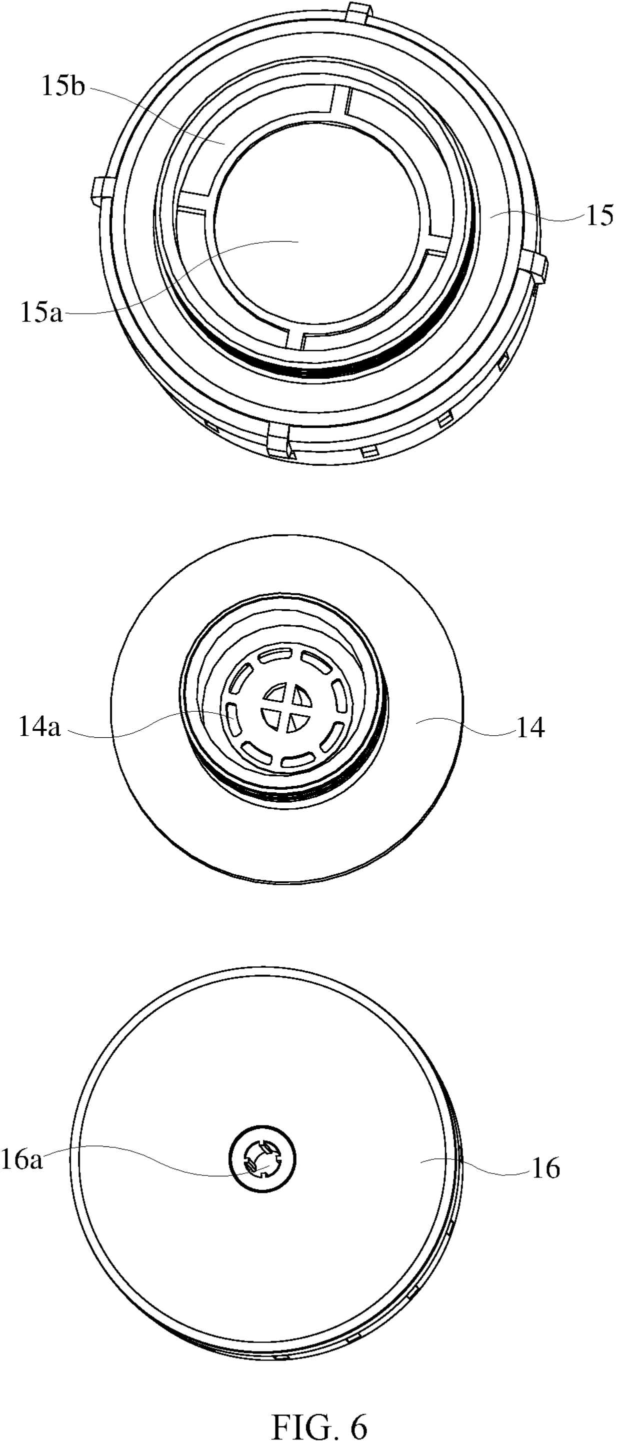
FIG. 6 is a schematic structural view of the upper end cap assembly and the lower end cap assembly according to the embodiment in FIG. 4 from another perspective.

As shown in FIG. 4, FIG. 5, and FIG. 6, in an embodiment, the filter cartridge 10 also includes an upper end cap assembly and a lower end cap assembly 16, the upper end cap assembly is connected to the upper end surface of the filter body 12 and the shell 11, and the lower end cap assembly 16 is connected to the lower end surface of the filter body 12 and the shell 11. The upper end cap assembly and the lower end cap assembly 16 are also respectively formed with a first positioning member 141 and a second positioning member 161. The first positioning member 141 and the second positioning member 161 respectively extend into the first chamber 13*a* and the second chamber 13*b*. The second positioning member 161 is formed with a communication hole 16*a* communicated with the second chamber 13*b* and the water storage space 12*a*.

On the basis of the previous embodiment, the upper end cap assembly and the lower end cap assembly 16 are respectively configured to seal the upper end surface and the lower end surface of the filter body 12, so that in addition to the through hole on the water-path of the filter cartridge 10, the remaining parts are well sealed. In an embodiment, the upper end surface and the lower end surface of the filter body 12 are respectively connected to the upper end cap assembly and the lower end cap assembly 16 through adhesives such as quick-drying glue. In addition, the first positioning member 141 and the second positioning member 161 respectively extend into the two ends of the central hole 13*c* for centrally positioning the central tube 13. Due to the baffle 131, the upper end of the central tube 13 is blocked from the pure water while retaining the through hole at the upper end of the central tube 13. That is, the first chamber 13*a* leaves enough space for the installation of the first positioning member 141.

As shown in FIG. 4, in an embodiment, the filter cartridge 10 also includes an outer skeleton tube 17 provided between an outside the filter body 12 and the water storage space 12*a*, and an upper end and a lower end of the outer skeleton tube 17 are hermetically connected to the upper end cap assembly and the lower end cap assembly 16 respectively. Specifically, the outer skeleton tube 17, the upper end cap assembly, and lower end cap assembly 16 jointly function as a pressure-bearing seal. The water storage space 12*a* is isolated from the filter body 12, which prevents the pure water in the water storage space 12*a* from being contaminated by the wastewater or the raw water leaking from the filter body 12.

The outer skeleton tube 17 can be made of a variety of materials. In an embodiment, the material of the outer skeleton tube 17 is metal. The outer skeleton tube 17 can be a metal sleeve tube, and is respectively fixed with the upper end cap assembly and the lower end cap assembly 16 by screws. In an embodiment, the material of the outer skeleton tube 17 may also be the glass fiber. Specifically, the glass fiber is immersed in the AB glue mixed in a certain proportion, then wrapped around the outer surface of the filter body 12, and the structure of the upper end cap and the lower end cap in contact with the outer surface of the filter body 12 is wrapped together and covered, which forms an integrity after solidification. In another embodiment, the outer skeleton tube 17 is made of the plastic, and the plastic has advantages of lower cost and easy processing and manufacturing.

In an embodiment, the outer skeleton tube 17 is respectively connected to the upper end cap assembly and the lower end cap assembly 16 through sealing members, or the outer skeleton tube 17 is respectively connected to the upper end cap assembly and the lower end cap assembly 16 by rotation welding. In an embodiment, a first sealing member 181 and a second sealing member 182 are respectively provided between the upper end cap assembly and the metal sleeve tube, and between the lower end cap assembly 16 and the metal sleeve tube. In an embodiment, the sealing members are multiple sealing rings, and corresponding sealing grooves are provided among the upper end cap assembly, the lower end cap assembly 16, and the outer skeleton tube 17. The rotation welding connection is a common welding method, and products connected using this method have better sealing properties.

In other embodiments, the skeleton tube is respectively connected to the upper end cap assembly and the lower end cap assembly 16 through glue bonding or rubber sealing assembly.

In an embodiment, the outer skeleton tube 17 is integrated with the upper end cap assembly, or the outer skeleton tube 17 can be integrated with any one of the upper end cap assembly and the lower end cap assembly 16. Specifically, the outer skeleton tube 17 can be integrated with any one of the upper end cap assembly and the lower end cap assembly 16 to simplify the assembly process of the filter cartridge 10.

In an embodiment, the upper end cap assembly includes a first upper end cap 14 and a second upper end cap 15, the first upper end cap 14 is formed with a first through hole 14*a*, and the first through hole 14*a* is communicated with the filter body 12 and the wastewater outlet 11*c*. The second upper end cap 15 is formed with a second through hole 15*a* and a third through hole 15*b*, the second through hole 15*a* is configured to avoid the first through hole 14*a*, the third through hole 15*b* is communicated with the water inlet 11*a* and the filter body 12, the first positioning member 141 is formed on the first upper end cap 14, and the second upper end cap 15 is hermetically connected to the outer skeleton tube 17. Specifically, the first upper end cap 14 is communicated with the wastewater outlet 11*c*, and the second upper end cap 15 is communicated with the water inlet 11*a*. A pure water outlet 11*b* is formed between the second upper end cap 15 and the inner wall of the shell 11. Furthermore, a sealing member is also provided between the first upper end cap 14 and the second upper end cap 15. The first upper end cap 14 and the second upper end cap 15 separate the water inlet 11*a*, the pure water outlet 11*b*, and the wastewater outlet 11*c*, so that the filter cartridge 10 has better sealing performance.

In an embodiment, the filter body 12 is an RO filter body 12. In an embodiment, the filter body 12 can also be a composite filter body 12 composed of the RO filter body 12 and other filter bodies 12, such as the activated carbon filter body 12, the polyaluminum chloride (PAC) filter body 12, and the ceramic filter body 12, etc.

In an embodiment, the shell 11 includes a shell body 111 and a shell cover 112. A bottom end of the shell body 111 is provided with an opening. The shell cover 112 is detachably provided at a bottom opening of the shell body 111, which facilitates the maintenance of the filter cartridge 10 and the replacement of the filter body 12.

The present application also provides a water purification system, including the filter cartridge 10 as described above. The specific structure of the filter element 10 refers to the above embodiment. Since the filter cartridge 10 adopts all the technical solutions of all the above embodiments, it has at least all the functions brought by the technical solutions of the above embodiments, which will not be described again here. The filter cartridge 10 is installed in the water purification system. The water purification system includes pipelines respectively communicated with the water inlet 11*a*, the pure water outlet 11*b*, and the wastewater outlet 11*c* of the shell.

The above descriptions are only embodiments of the present application, and are not intended to limit the scope of the present application. Under the inventive concept of the present application, any equivalent structural transformations made by using the contents of the description and drawings of the present application, or direct/indirect applications in other related technical fields, are included in the scope of the present application.

What is claimed is:

1. A filter cartridge, comprising:

a shell provided with an accommodating chamber and a water inlet, a pure water outlet, and a wastewater outlet communicated with the accommodating chamber;

a filter body provided in the accommodating chamber, wherein the water inlet is communicated with the wastewater outlet through the filter body, a water storage space is provided between an outer peripheral wall of the filter body and an inner wall of the shell, and the water storage space is communicated with the pure water outlet; and a central tube provided in the filter body, wherein a sidewall of the central tube is provided with a central hole communicated with the filter body, and a through hole at a lower end of the central tube is communicated with the water storage space;

an upper end cap assembly and a lower end cap assembly; and an outer skeleton tube provided between an outside of the filter body and the water storage space;

wherein a baffle is provided in the central tube, the central tube is divided into a first chamber and a second chamber by the baffle, the first chamber is communicated with a through hole at an upper end of the central tube, the second chamber is communicated with a through hole at a lower end of the central tube, and the central hole is communicated with the second chamber;

an upper end surface of the filter body is connected to the shell through the upper end cap assembly, a lower end surface of the filter body is connected to the shell through the lower end cap assembly, the upper end cap assembly and the lower end cap assembly are also respectively formed with a first positioning member and a second positioning member, the first positioning member and the second positioning member respectively extend into the first chamber and the second chamber, the second positioning member is formed with a communication hole, and the second chamber is communicated with the water storage space through the communication hole; and an upper end of the outer skeleton tube is hermetically connected to the upper end cap assembly, and a lower end of the outer skeleton tube is hermetically connected to the lower end cap assembly.

2. The filter cartridge of claim 1, wherein:

the outer skeleton tube is respectively connected to the upper end cap assembly and the lower end cap assembly through a sealing member; or the outer skeleton tube is respectively connected to the upper end cap assembly and the lower end cap assembly through a rotation welding, a glue bonding or a rubber sealing assembly.

3. The filter cartridge of claim 1, wherein:

the outer skeleton tube is integrated with the upper end cap assembly; or the outer skeleton tube is integrated with the lower end cap assembly.

4. The filter cartridge of claim 1, wherein a material of the outer skeleton tube is metal, plastic or fiberglass made of a mixture of glass fiber and AB glue.

5. The filter cartridge of claim 1, wherein the upper end cap assembly comprises a first upper end cap and a second upper end cap, the first upper end cap is formed with a first through hole, the filter body is communicated with the wastewater outlet through the first through hole, the second upper end cap is formed with a second through hole and a third through hole, the second through hole is configured to avoid the first through hole, the water inlet is communicated with the filter body through the third through hole, the first positioning member is formed on the first upper end cap, and the second upper end cap is hermetically connected to the outer skeleton tube.

6. The filter cartridge of claim 1, wherein the filter body is a reverse osmosis (RO) membrane filter body.

7. A water purification system, comprising the filter cartridge of claim 1.

* * * * *